US012278815B2

(12) United States Patent
Aronson

(10) Patent No.: US 12,278,815 B2
(45) Date of Patent: *Apr. 15, 2025

(54) IDENTITY AUTHENTICATION PROCESS

(71) Applicant: Jeffry David Aronson, Austin, TX (US)

(72) Inventor: Jeffry David Aronson, Austin, TX (US)

(*) Notice: Subject to any disclaimer, the term of this patent is extended or adjusted under 35 U.S.C. 154(b) by 283 days.

This patent is subject to a terminal disclaimer.

(21) Appl. No.: 17/878,378

(22) Filed: Aug. 1, 2022

(65) Prior Publication Data

US 2022/0394037 A1 Dec. 8, 2022

Related U.S. Application Data

(63) Continuation-in-part of application No. 16/891,088, filed on Jun. 3, 2020, now Pat. No. 11,444,947, which
(Continued)

(51) Int. Cl.

| | |
|---|---|
| *H04L 9/40* | (2022.01) |
| *G06F 21/32* | (2013.01) |
| *G06F 21/40* | (2013.01) |
| *G06Q 10/10* | (2023.01) |

(52) U.S. Cl.
CPC .............. *H04L 63/10* (2013.01); *G06F 21/32* (2013.01); *G06F 21/40* (2013.01); *G06Q 10/10* (2013.01)

(58) Field of Classification Search
CPC . H04L 63/10; H04L 63/0815; H04L 63/0861; H04L 63/0876; H04L 63/102;
(Continued)

(56) References Cited

U.S. PATENT DOCUMENTS

| | | | | |
|---|---|---|---|---|
| 6,810,480 | B1* | 10/2004 | Parker | G06F 21/32 |
| | | | | 713/168 |
| 2008/0040780 | A1* | 2/2008 | Reinhold | H04M 3/38 |
| | | | | 726/5 |

(Continued)

OTHER PUBLICATIONS

Oliveira et al., "A Security API for Multimodal Multi-biometric Continuous Authentication", Dec. 2011, Seventh International Conference on Computational Intelligence and Security, pp. 988-992 (Year: 2011).*

*Primary Examiner* — Kenneth W Chang
(74) *Attorney, Agent, or Firm* — Kowert, Hood, Munyon, Rankin & Goetzel, P.C.; Brian E. Moore

(57) ABSTRACT

A scalable configurable universal complete spectrum identity authentication process that utilizes all or part of at least one computer, and necessary resources for making identity authentication determinations as to whether or not one specific sensor-observed tested person is the same person as the one specific known person he or she claims to be. The identity authentication process makes one-time, intermittently performed, or constantly performed identity authentication determinations regarding any one specific tested person, and it is configurable for doing so at any attainable level of accuracy including 100% accuracy. The identity authentication process is configurable for interacting with itself or utilized cyber resources to perform possible variable functions, it utilizes data representing recognized aspects, characteristics or features for comparing or determining, and it utilizes observation data, derived data, useful information, or outcomes from comparing for making identity authentication determinations, and it may report on any of its operations.

20 Claims, 2 Drawing Sheets

Related U.S. Application Data is a continuation-in-part of application No. 16/583,257, filed on Sep. 26, 2019, now Pat. No. 10,708,271, which is a continuation-in-part of application No. 15/456,542, filed on Mar. 12, 2017, now Pat. No. 10,462,139, which is a continuation-in-part of application No. 15/071,075, filed on Mar. 15, 2016, now Pat. No. 9,635,025, which is a continuation-in-part of application No. 14/857,445, filed on Sep. 17, 2015, now Pat. No. 9,319,414, which is a continuation-in-part of application No. 14/316,196, filed on Jun. 26, 2014, now Pat. No. 9,166,981, which is a continuation of application No. 13/784,277, filed on Mar. 4, 2013, now Pat. No. 8,769,649, which is a continuation of application No. 13/688,925, filed on Nov. 29, 2012, now Pat. No. 8,434,136.

(58) Field of Classification Search
CPC ........ G06F 21/32; G06F 21/40; G06F 21/316; G06Q 10/10
See application file for complete search history.

(56) References Cited

U.S. PATENT DOCUMENTS

| | | | | |
|---|---|---|---|---|
| 2008/0317292 A1* | 12/2008 | Baker | .................... | G06V 40/12 |
| | | | | 382/115 |
| 2010/0115610 A1* | 5/2010 | Tredoux | ................ | G06F 21/316 |
| | | | | 726/19 |
| 2013/0133055 A1* | 5/2013 | Ali | ...................... | H04L 63/0861 |
| | | | | 726/7 |

* cited by examiner

IDENTITY AUTHENTICATION PROCESS

CROSS REFERENCE TO RELATED APPLICATIONS

This application is a continuation-in-part application of U.S. patent application Ser. No. 16/891,088, filed Jun. 3, 2020, entitled IDENTITY TESTING MACHINE, having the same inventor, now allowed, which is incorporated herein by reference in its entirety;

which application is a continuation-in-part application of U.S. patent application Ser. No. 16/583,257, filed Sep. 26, 2019, issued as U.S. Pat. No. 10,708,271 on Jul. 7, 2020, entitled SCALABLE CONFIGURABLE UNIVERSAL FULL SPECTRUM CYBERSPACE IDENTITY VERIFICATION TEST, having the same inventor, which is incorporated herein by reference in its entirety;

which application is a continuation-in-part application of U.S. patent application Ser. No. 15/456,542, filed Mar. 12, 2017, issued as U.S. Pat. No. 10,462,139 on Oct. 29, 2019, entitled SCALABLE UNIVERSAL FULL SPECTRUM CYBER DETERMINING PROCESS, having the same inventor, which is incorporated herein by reference in its entirety;

which application is a continuation-in-part application of U.S. patent application Ser. No. 15/071,075, filed Mar. 15, 2016, issued as U.S. Pat. No. 9,635,025 on Apr. 25, 2017, entitled SCALABLE UNIVERSAL FULL SPECTRUM CYBER DETERMINING MACHINE, having the same inventor, which is incorporated herein by reference in its entirety;

which application is a continuation-in-part application of U.S. patent application Ser. No. 14/857,445, filed Sep. 17, 2015, issued as U.S. Pat. No. 9,319,414 on Apr. 19, 2016, entitled SCALABLE FULL SPECTRUM CYBER DETERMINATION PROCESS, having the same inventor, which is incorporated herein by reference in its entirety;

which application is a continuation-in-part application of U.S. patent application Ser. No. 14/316,196, filed Jun. 26, 2014, issued as U.S. Pat. No. 9,166,981 on Oct. 20, 2015, entitled FULL SPECTRUM CYBER IDENTIFICATION DETERMINATION PROCESS, having the same inventor, which is incorporated herein by reference in its entirety;

which application is a continuation of U.S. patent application Ser. No. 13/784,277, filed Mar. 4, 2013, issued as U.S. Pat. No. 8,769,649 on Jul. 1, 2014, entitled FULL SPECTRUM CYBER IDENTIFICATION DETERMINATION PROCESS, having the same inventor, which is incorporated herein by reference in its entirety;

which application is a continuation of U.S. patent application Ser. No. 13/688,925, filed Nov. 29, 2012, issued as U.S. Pat. No. 8,434,136 on Apr. 30, 2013, entitled FULL SPECTRUM CYBER IDENTIFICATION DETERMINATION PROCESS, having the same inventor, which is incorporated herein by reference in its entirety.

FIELD OF THE DISCLOSURE

The present disclosure relates generally to a scalable configurable universal complete spectrum identity authentication process that utilizes a unique identity authentication dataset for one specific known person to make at least one identity authentication determination regarding any one specific tested person who claims to be the one specific known person. The present disclosure more particularly relates to an identity authentication process that utilizes at least one computer that is configured to be utilized, at least in part, for authenticating or not authenticating the claimed identity of one specific tested person through its utilizing a file or files containing data that represent the unique cyberspace identity or identifiers for the one specific known person that the tested person claims to be.

BACKGROUND OF THE DISCLOSURE

Cybersecurity is the protection of cyber resources, including the hardware, the software and the information stored in the hardware or software, from theft or malicious damage thereto. Cybersecurity typically entails controlling access to cyber resources in order to prevent malicious disruption or misdirection of the services or of the information those cyber resources provide.

Cybersecurity has become increasingly important as the world has become increasingly reliant on cyber resources. Moreover, with the advent of the Internet of Things (IoT), networks have become increasingly complex. Hence, in addition to various types of personal computers and smartphones, networks have come to include almost any device which can be embedded with electronics, programming, sensors and network connectivity. The increasing importance of cyber systems has made cybersecurity more critical, while the increasing complexity of cyber systems has made cybersecurity increasingly challenging. Together, these factors make existing cybersecurity measures increasingly inadequate.

At the heart of most cybersecurity failures is the complete inability of computers and cyber resources to accurately authenticate or not authenticate the claimed identity of any one specific person as a condition for allowing or denying the specific person to access selected cyber resources. Utilizing identity authentication determinations is an indispensable part of putting an end to the security failures that now plague cyberspace.

SUMMARY OF THE DISCLOSURE

Unless otherwise specified herein, throughout this entire disclosure, use of the singular form of any word, phrase or statement indicates either the singular or the plural form of the word, phrase or statement, and use of the plural form of any word, phrase or statement indicates either the singular or the plural form of the word, phrase or statement. Additionally, the term "or" shall be construed as the logically inclusive "or". Hence, the statement "A or B" shall be true if: (a) only A is true, (b) only B is true or (c) both A and B are true; the notation "A and/or B" explicitly refers to the logically inclusive "or".

In one aspect is a scalable configurable universal full spectrum identity authentication process, the identity authentication process comprising utilizing:
  (a) at least one computing device,
  (b) at least one sensor observation,
  (c) criteria selected from the spectrum of criteria that may be utilized by the identity authentication process,
  (d) selected useful information,
  (e) selected necessary programming and
  (f) any other necessary resources,
  all of which are configured and utilized for the making of at least one identity authentication determination as to whether or not one specific tested person is the one specific known person that the tested person claims to be;

wherein the identity authentication process utilizes all or part of the resources of the at least one computing device;

wherein the at least one utilized computing device includes at least one tangible, non-transient memory device and at least one input device or at least one output device;

wherein the identity authentication process is configurable and may be configured for utilization in at least one configuration;

wherein the identity authentication process's identity tests are selected from a spectrum of identity tests that utilize sensor observations of people in the making of authentication determinations as to whether or not one specific tested person is the one specific known person that the tested person claims to be;

wherein the one specific tested person is from the spectrum of people who claim to be any one specific known person;

wherein the any other necessary resources are selected from the spectrum of other resources that may be necessary for the identity authentication process to utilize;

wherein the identity authentication process is utilizable under at least one sensor observation circumstance selected from the spectrum of sensor observation circumstances;

wherein necessary programming is selected from the spectrum of programming that may be necessary for an identity authentication process to utilize;

wherein an identity authentication process utilizes useful information from at least one point in time or from over at least one period of time;

wherein useful information is selected from the spectrum of information that may be utilized by an identity authentication process;

wherein the spectrum of useful information includes information that was from or was derived from at least one sensor observation;

wherein the at least one sensor observation provides useful information regarding at least one aspect of (1) at least one sensor observation, (2) one specific known person and (3) one specific tested person;

wherein at least one aspect of the one specific known person or the one specific tested person is selected from the spectrum of sensor-observable aspects of people;

wherein the identity authentication process utilizes at least one observed characteristic regarding the at least one aspect of the one specific known person or the one specific tested person in the making of at least one identity authentication determination;

wherein the at least one observed characteristic is selected from the spectrum of sensor-observable characteristics of people;

wherein the identity authentication process is configurable for utilizing at least one type of sensor observation selected from the group consisting of (a) visual sensor observations, (b) audible sensor observations, (c) thermal sensor observations, (d) olfactory sensor observations, (e) tactile sensor observations, (f) chemical sensor observations or (g) any other types of sensor observations that may be utilized by the identity authentication process;

wherein the at least one sensor observation may have at least one characteristic that is utilizable by the identity authentication process;

wherein the at least one characteristic is selected from the spectrum of characteristics of sensor observations that may be utilized by the identity authentication process;

wherein the identity authentication process is scalable in regard to included or utilized resources, wherein its included or utilized resources fall at one point in a range of from a minimum to a maximum;

wherein at its minimum, the identity authentication process includes or utilizes only the resources that are necessary for providing for the least complex, in regard to included or utilized resources, of all identity authentication process needs for included or utilized resources; and at its maximum, the identity authentication process includes or utilizes all of the resources that are necessary for providing for the making of the most complex, in regard to included or utilized resources, of all identity authentication process needs for included or utilized resources;

wherein the identity authentication process is configurable for determining or utilizing at least one measure of adequacy of available resources;

wherein the identity authentication process is configurable for determining or utilizing at least one measure of adequacy of available useful information;

wherein the identity authentication process is configurable for determining or utilizing at least one measure of accuracy of at least one identity authentication determination;

wherein the identity authentication process is configurable for making at least one type of identity authentication determination selected from the group consisting of (1) identity authentication determinations that are made as single events, (2) intermittently made identity authentication determinations, or (3) constantly made identity authentication determinations, regarding whether or not one specific tested person is the one specific known person that the tested person claims to be;

wherein the identity authentication process is configurable for authenticating the identity of any one specific tested person in real time or at any time thereafter; and wherein the identity authentication process is further configurable for utilizing at least one part of at least one step selected from the group consisting of (a) a first series observation step, wherein the identity authentication process utilizes at least one sensor observation, wherein one specific known person is one specific subject of the at least one sensor observation, wherein the one specific known person has at least one specific sensor-observable aspect, wherein the identity authentication process recognizes at least one characteristic regarding the at least one specific aspect, wherein the at least one recognized characteristic is utilizable by the identity authentication process in the making of at least one identity authentication determination regarding the one specific known person, wherein the identity authentication process utilizes at least one designation from the at least one sensor observation or assigns at least one designation representing (i) the at least one sensor observation, (ii) the at least one sensor-observed aspect of the one specific known person or (iii) the at least one sensor-observed characteristic regarding the at least one observed aspect, wherein the identity authentication process includes the at least one designation as data, in at least one first series observation record of the one specific known person, (b) a second series observation step, wherein the identity authentication process utilizes at least one sensor observation, wherein one specific tested person is one specific subject of the at least one sensor observation, wherein the one specific tested person has at least one specific sensor-observable aspect, wherein the identity authentication process recognizes at least one characteristic regarding the at least one specific aspect, wherein the at least one recognized characteristic is utilizable by the identity authentication process in the making of at least one identity authentication determination regarding the one specific tested person, wherein the identity authentication process utilizes at least one designation from the at least one sensor observation or assigns at least one designation representing (i) the at least one sensor observation, (ii) the at least one sensor-observed aspect of the one specific tested person or (iii) the at least one characteristic regarding the at least one sensor-observed aspect, wherein the identity authentication process includes at least one designation as data in at least one second series observation record of the one specific tested person, (c) a processing step, wherein at least one designation from the at least one first series observation records or at least one designation from the at least one second series observation records are stored or utilized as data, wherein at least part of the data from the at least one first series observation step or the at least one second series observation step is processed utilizing at least one method, process, procedure or formula, wherein the at least one method, process, procedure or formula is selected from the spectrum of methods, processes, procedures or formulas that may be utilized in the processing of data from first series observation steps or from second series observation steps, wherein the processing of the observation data or derived data results in the creation of derived data, wherein the observation data or the derived data is utilizable for at least one purpose selected from the spectrum of purposes for which observation data or derived data may be utilized, wherein the at least one purpose includes utilizing the observation data or the derived data in the making of at least one identity authentication determination as to whether or not one specific tested person is the same person as the one specific known person the tested person claims to be, wherein at least one part of the observation data or the derived data is utilizable by the identity authentication process in at least one part of at least one step selected from the group consisting of (i) at least one processing step, (ii) at least one matching step, (iii) at least one comparing step or (iv) at least one determining step, (d) a matching step, wherein observation data or derived data from at least one second series observation record of the one specific tested person is matched with comparable observation data or derived data from at least one first series observation record of the one specific known person that the tested person claims to be, (e) a comparing step, wherein the identity authentication process compares observation data or derived data from at least one second series observation record of the one specific tested person with comparable observation data or derived data from at least one first series observation record of the one specific known person the tested person claims to be and provides at least one conclusion from the comparing, (f) a determining step, wherein the identity authentication process utilizes at least one member selected from the group consisting of P (i) at least one part of at least one conclusion from at least one comparing step, (ii) at least one part of the observation data, (iii) at least one part of the derived data or (iv) selected useful information, in the making of at least one identity authentication determination and (g) a reporting step, wherein the identity authentication process provides at least one selected report regarding at least one part of at least one cycle of utilization of the identity authentication process.

In some embodiments the identity authentication process at least one part of the observation data or the derived data from at least one first series observation record of one specific known person is utilized as the one specific known person's cyberspace identity or identifiers; wherein the one specific known person's cyberspace identity or identifiers are unique to the one specific known person; and wherein at least one part of the observation data or the derived data from at least one first series observation record for any other one specific known person is utilizable as the cyberspace identity or identifiers for the any other one specific known person and the cyberspace identity or identifiers are unique to each one specific other known person.

In some embodiments the identity authentication process achieves at least one selected attainable percentage of accuracy goal for at least one identity authentication determination; and wherein the at least one attainable percentage of accuracy goal falls within a range extending from 0% accuracy up to and including 100%.

In some embodiments the identity authentication process is utilizable at any possible level of observation participation by the one specific tested person or the one specific known person; and wherein any possible level of observation participation ranges from the one specific tested person or the one specific known person being sensor-observable but not being consciously or otherwise engaged in at least one identity authentication process sensor observation, to the one specific tested person or the one specific known person being active and consciously engaged participants in at least one identity authentication process sensor observation.

In some embodiments of the identity authentication process, at least one sensor observation occurs over at least one period of time and the at least one sensor observation includes at least one observed change that occurs over the at least one period of time to at least one member selected from the group consisting of (a) at least one sensor-observable aspect of the sensor observation, (b) at least one sensor-observable aspect of the one specific known person or (c) at least one sensor-observable aspect of the one specific tested person; wherein the identity authentication process is configurable for utilizing the at least one sensor-observed change that occurs over at least one period of time in the making of at least one identity authentication determination.

In some embodiments of the identity authentication process at least one observed change that occurs over at least one period of time includes at least one change to at least one aspect of at least one feature of one specific person; and wherein the at least one feature of the one specific person is selected from the group consisting of the one specific person's head, face, mouth, eyes, eyebrows, nose, arms, hands, fingers, legs, feet, neck, torso, skin, heart, stomach, intestines, liver, kidneys, lungs, respiration, breath, vascular system, brain, spinal cord, neural system, skeleton, blood or any other feature of people selected from the spectrum of features of people where sensor-observable changes occur over time.

In some embodiments of the identity authentication process, all or part of the observation data or the derived data from at least one first series observation record of the one specific known person or at least one second series observation record of the one specific tested person are included as a part of the spectrum of useful information.

In some embodiments of the identity authentication process at least one identity authentication determination includes at least one determination of any indicated percentage of probability that exists of one specific tested person being the same person as the one specific known person that the tested person claims to be; wherein the at least one identity authentication determination ranges from determining that a 0% probability exists of the one specific tested person being the one specific known person, through determining any intermediate indicated percentage of probability that exists of the one specific tested person being the one specific known person, to determining there is a 100% probability that the one specific tested person absolutely is the one specific known person that the tested person claims to be.

In some embodiments the identity authentication process further includes a repeating step, wherein the identity authentication process selects at least one part of at least one first series observation of the one specific known person that the tested person claims to be for repetition by the one specific tested person; wherein the one specific tested person is sensor-observed performing the at least one repetition; wherein the identity authentication process utilizes at least one designation from the repetition observation or assigns at least one designation representing at least one member selected from the group consisting of (a) the at least one sensor observation, (b) the at least one repetition, (c) at least one sensor-observable aspect of the one specific tested person or (d) at least one characteristic regarding the at least one sensor-observable aspect of the one specific tested person; and wherein the identity authentication process includes at least one designation in at least one second series observation record of the tested person.

In some embodiments the identity authentication process is further configured for searching and utilizing available first series observation records of the one specific known person that the tested person claims to be until either the identity authentication determination goal for the one specific tested person has been achieved or there are no further comparable first series observation records to search or utilize.

In some embodiments the identity authentication process utilizes useful information from at least one source other than at least one member selected from the group consisting of (a) at least one first series observation record of the one specific known person that the tested person claims to be or (b) at least one second series observation record of the one specific tested person.

In some embodiments the identity authentication process utilizes selected criteria, selected useful information, selected programming and any other necessary resources for the purpose of making identity authentication determinations that are utilized, at least in part, to determine whether to allow or to deny the one specific tested person access to at least one part of at least one resource selected from the group consisting of (a) the identity authentication process, (b) at least one resource that is being utilized by the identity authentication process or (c) at least one resource that is utilizing the identity authentication process.

In some embodiments the identity authentication process manipulates, in any way possible, at least one operation of at least one member selected from the group consisting of (a) resources that are being utilized by the identity authentication process or (b) the identity authentication process itself; wherein the manipulating provides the identity authentication process with selection of possible utilizations; wherein the manipulating is utilized for at least one purpose; wherein the at least one purpose for utilizing the manipulating includes aiding in achieving at least one selected identity authentication determination goal.

In some embodiments the identity authentication process further includes identity authentication process history; wherein the history includes at least one history record of or from the operations of the identity authentication process.

In some embodiments of the identity authentication process, at least one part of at least one observation record for one specific known person that was derived from at least one source other than at least one first series observation step is included as at least one part of at least one first series observation record for the one specific known person.

In some embodiments of the identity authentication process, at least one part of at least one observation record for the one specific tested person that was derived from at least one source other than at least one second series observation step is included as at least one part of at least one second series observation record for the one specific tested person.

In some embodiments of the identity authentication process, the operations of the identity authentication process or any part thereof are performed in any usable order.

In some embodiments the identity authentication process includes at least one standard identity authentication process designation representing at least one part of at least one aspect of at least one operation of the identity authentication process.

In another aspect is a scalable, configurable, universal, full spectrum identity authentication process comprising utilizing useful information from at least one point in time or over at least one period of time;

wherein the useful information is from a spectrum of information that includes at least one observed characteristic of one specific person who is one specific subject of at least one identity authentication process sensor observation;

wherein the at least one sensor observation is a type of sensor observation selected from the group consisting of (a) visual sensor observations, (b) audible sensor observations, (c) thermal sensor observations, (d) olfactory sensor observations, (e) tactile sensor observations and (e) any other type of sensor observations that can be utilized by the identity authentication process;

wherein the identity authentication process makes at least one identity authentication determination as to whether or not one specific tested person is the same person as the one specific known person that the tested person claims to be, which is accomplished by utilizing (a) at least one computing device, (b) criteria that may be utilized by the identity authentication process, (c) selected useful information and (d) any necessary programming or resources;

wherein the identity authentication process provides at least one duration of identity authentication determinations selected from the group consisting of (i) at least one single event identity authentication determination that is made at one specific point in time, (ii) at least one set of intermittently made identity authentication determinations and (iii) at least one set of constantly made identity authentication determinations;

wherein the identity authentication determinations are utilized for at least one purpose;

wherein the identity authentication process further comprises utilizing at least one part of at least one step selected from the group consisting of (a) a first series observation step utilizing at least one sensor observation; wherein one specific known person has at least one sensor-observable aspect; the identity authentication process recognizes at least one characteristic regarding the at least one sensor-observed aspect, the at least one recognized characteristic is utilizable by the identity authentication process in making at least one selected identity authentication determination; wherein the identity authentication process utilizes at least one designation from the at least one sensor observation or assigns at least one designation representing (i) the at least one sensor observation, (ii) the at least one sensor-observed aspect of the one specific known person and (iii) the at least one recognized characteristic; wherein the identity authentication process includes at least one of the designations as data in at least one first series observation record of the one specific known person, (b) a second series observation step utilizing at least one sensor observation; wherein one specific tested person has at least one sensor-observable aspect; the identity authentication process recognizes at least one characteristic regarding the at least one sensor-observed aspect; the at least one recognized characteristic is utilizable by the identity authentication process in making at least one selected identity authentication determination; the identity authentication process utilizes at least one designation from the at least one sensor observation or assigns at least one designation representing (i) the at least one sensor observation, (ii) at least one sensor-observed aspect regarding the one specific tested person and (iii) the at least one characteristic regarding the at least one aspect; wherein the identity authentication process includes at least one of the designations as data in at least one second series observation record of the one specific tested person, (c) a processing step, wherein at least one designation from the at least one first series observation record or at least one designation from the at least one second series observation record is stored or utilized as data; wherein all or part of the observation data representing the at least one designation from the first series observation step or the second series observation step may be processed in at least one way, the at least one way is selected from the group consisting of the complete spectrum of ways that observation data may be processed for utilization by the identity authentication process; wherein the processing of the observation data results in the creation of derived data; wherein the observation data or the derived data may be utilized for at least one purpose selected from the group consisting of a complete spectrum of purposes that observation data or derived data may be utilized, the at least one purpose includes being utilized by the identity authentication process in making at least one selected identity authentication determination as to whether or not the tested person is the same person as the known person that the tested person claims to be; wherein at least one part of the observation data or the derived data may be included as at least one part of the useful information and at least one part of the observation data or the derived data may be utilized by the identity authentication process during at least one part of at least one step selected from the group consisting of at least one processing step, at least one matching step, at least one comparing step or at least one determining step, (d) a matching step, matching sensor observation data or derived data regarding the one specific tested person with comparable sensor observation data or derived data from at least one first series observation record of the one specific known person the tested person claims to be, (e) a comparing step, comparing sensor observation data or derived data from at least one second series observation record of the one specific tested person with sensor observation data or derived data from at least one comparable first series observation record of the one specific known person that the tested person claims to be and providing at least one conclusion from the comparing, (f) a determining step, wherein the identity authentication process utilizes at least one member selected from the group consisting of (i) at least one conclusion from at least one comparing step, (ii) sensor observation data or derived data from said first series observation records of the one specific known person or the second series observation records of the one specific tested person and (iii) useful information, for making at least one identity authentication determination and (g) a reporting step, providing at least one selected report regarding or utilizing at least one part of at least one cycle of utilization of the identity authentication process.

In yet another aspect is a scalable configurable universal complete spectrum identity authentication process for making identity authentication determinations regarding whether or not one specific tested person is the same person as the one specific known person that the tested person claims to be; the identity authentication process comprising performing identity authentication processes on specific sensor observation subjects by utilizing (a) at least one computing device, (b) at least one sensor, (c) criteria selected from the group consisting of criteria that may be utilized by said identity authentication process, (d) selected useful information, (e) selected necessary programming and (f) any other necessary resource;

wherein identity authentication tests are utilized by the identity authentication process, the identity authentication tests are selected from the group consisting of the complete spectrum of types of identity authentication tests that may be utilized for making authentication determinations regarding the claimed identity of any one specific tested person;

wherein the any other necessary resources are selected from the group consisting of a complete spectrum of other resources that may be necessary for the identity authentication process to utilize;

wherein the identity authentication process is utilizable under at least one set of identity authentication test circumstances selected from the group consisting of a complete spectrum of circumstances under which identity authentication testing may be performed;

wherein the identity authentication testing is utilized for at least one purpose selected from the group consisting of a complete spectrum of purposes for which identity authentication testing may be utilized;

wherein the necessary programming is selected from the group consisting of a complete spectrum of programming that may be utilized by the identity authentication process;

wherein the identity authentication process utilizes useful information from at least one point in time or from over at least one period of time;

wherein the useful information is selected from the group consisting of a complete spectrum of information that may be utilized by the identity authentication process;

wherein the complete spectrum of useful information includes information that was from or that was derived from at least one sensor observation;

wherein the at least one sensor observation provides useful information regarding at least one aspect of at least one member selected from the group consisting of (a) the at least one sensor observation, (b) the one specific known person or (c) the one specific tested person;

wherein the one specific tested person is one specific subject of at least one sensor observation;

wherein at least one aspect of the one specific known person or the one specific tested person is selected from the group consisting of a complete spectrum of sensor-observable aspects of people who are subjects of sensor observations;

wherein the identity authentication process's tests utilize at least one observed characteristic regarding at least one aspect of (1) the one specific known person and the one specific tested person;

wherein the at least one observed characteristic is selected from the group consisting of a complete spectrum of sensor-observable characteristics of people who are subjects of identity sensor observations;

wherein the identity authentication tests utilize at least one type of sensor observation selected from the group consisting of (a) visual sensor observations, (b) audible sensor observations, (c) thermal sensor observations, (d) olfactory sensor observations (e) tactile sensor observations or (f) any other types of sensor observations that may be utilized by the identity authentication process; wherein at least one sensor observation has at least one characteristic that may be utilized by the identity authentication process, the at least one characteristic is selected from the group consisting of a complete spectrum of characteristics of sensor observations that may be utilized by the identity authentication process;

wherein the identity authentication process utilizes necessary resources and is scalable in regard to included necessary resources; wherein the included necessary resources fall at one point in a range of from a minimum to a maximum; wherein at a minimum, the identity authentication process includes only the resources that are necessary for providing for the least complex, in regard to included necessary resources, of all identity authentication process needs for resources; wherein at a maximum, the identity authentication process includes all of the resources that are necessary for providing for the most complex, in regard to included necessary resources, of all identity authentication process needs for resources;

wherein the identity authentication process may be configured for determining or utilizing at least one measure of adequacy of available resources;

wherein the identity authentication process may be configured for determining or utilizing at least one measure of adequacy of available useful information;

wherein the identity authentication process may be configured for determining or utilizing at least one measure of accuracy of at least one identity authentication test determination;

wherein the identity authentication process makes at least one duration of identity authentication test determinations selected from the group consisting of (a) at least one single event identity authentication test determination regarding one specific tested person that was made at one specific point in time, (b) at least one set of intermittently provided identity authentication test determinations regarding one specific tested person and (c) at least one set of constantly provided identity authentication test determinations regarding one specific tested person;

wherein the identity authentication process is configurable for testing or authenticating the claimed identity of any one specific tested person in real time or at any time thereafter; and wherein the identity authentication process is further configurable for utilizing at least one part of at least one step selected from the group consisting of (a) a first series observation step, wherein the identity authentication process utilizes at least one sensor observation; wherein the one specific known person is one specific subject of the at least one sensor observation; wherein the one specific known person has at least one specific sensor-observable aspect; wherein the identity authentication process recognizes at least one characteristic regarding the at least one specific aspect; wherein the at least one recognized characteristic is utilizable by the identity authentication process in making at least one identity authentication test determination; wherein the identity authentication process utilizes at least one designation from at least one sensor observation or assigns at least one designation representing (i) the at least one sensor observation, (ii) the at least one sensor-observed aspect of the one specific known person and (iii) the at least one sensor-observed characteristic regarding the at least one specific observed aspect; wherein the identity authentication process includes at least one designation as data in at least one first series observation record of the one specific known person, (b) a second series observation step, wherein the identity authentication process utilizes at least one sensor observation; wherein one specific tested person is one specific subject of the at least one sensor observation; wherein the one specific tested person has at least one specific sensor-observable aspect; wherein the identity authentication process recognizes at least one characteristic regarding the at least one specific aspect; wherein the at least one recognized characteristic is utilizable by the identity authentication process in making at least one identity authentication test determination regarding the one specific tested person; wherein the identity authentication process utilizes at least one designation from the at least one sensor observation or assigns at least one designation representing (i) the at least one sensor observation, (ii) the at least one sensor-observed aspect of the one specific tested person and (iii) the at least one characteristic regarding the at least one sensor-observed aspect; wherein the identity authentication process includes the at least one designation as data in at least one second series observation record of the one specific tested person, (c) a processing step, wherein at least one part of the data representing the at least one designation from the at least one first series observation step or the at least one second series observation step may be processed in at least one way; wherein the at least one way is selected from the group consisting of a complete spectrum of ways that data from the first series observation step or the second series observation step may be processed for utilization by the identity authentication process; wherein processing of the observation data results in the creating of derived data; wherein the observation data or the derived data are utilizable for at least one purpose selected from the group consisting of a complete spectrum of purposes that observation data or derived data may be utilized; wherein the at least one purpose includes the observation data or the derived data being utilized by the identity authentication process in making at least one selected identity authentication test determination regarding one specific tested person, wherein at least one part of the observation data or the derived data may be utilized by the identity authentication process in at least one part of at least one step selected from the group consisting of at least one processing step, at least one matching step, at least one comparing step and at least one determining step, (d) a matching step, wherein the identity authentication process matches the observation data or the derived data from at least one second series observation record of the one specific tested person with comparable observation data or derived data from at least one first series observation record of the one specific known person that the tested person claims to be, (e) a comparing step, wherein the identity authentication process compares observation data or derived data from at least one second series observation record of the one specific tested person with comparable observation data or derived data from at least one first series observation record of the one specific known person and provides at least one conclusion from the comparing, (f) a determining step, wherein the identity authentication process utilizes at least one member selected from the group consisting of (i) at least one part of the at least one conclusion from the at least one comparing step, (ii) at least one part of the observation data, (iii) at least one part of the derived data and (iv) selected useful information for making the at least one identity authentication test determination and (g) a reporting step, wherein the identity authentication process provides at least one selected report regarding at least one part of at least one cycle of utilization of the identity authentication process.

DETAILED DESCRIPTION

Figure 1:
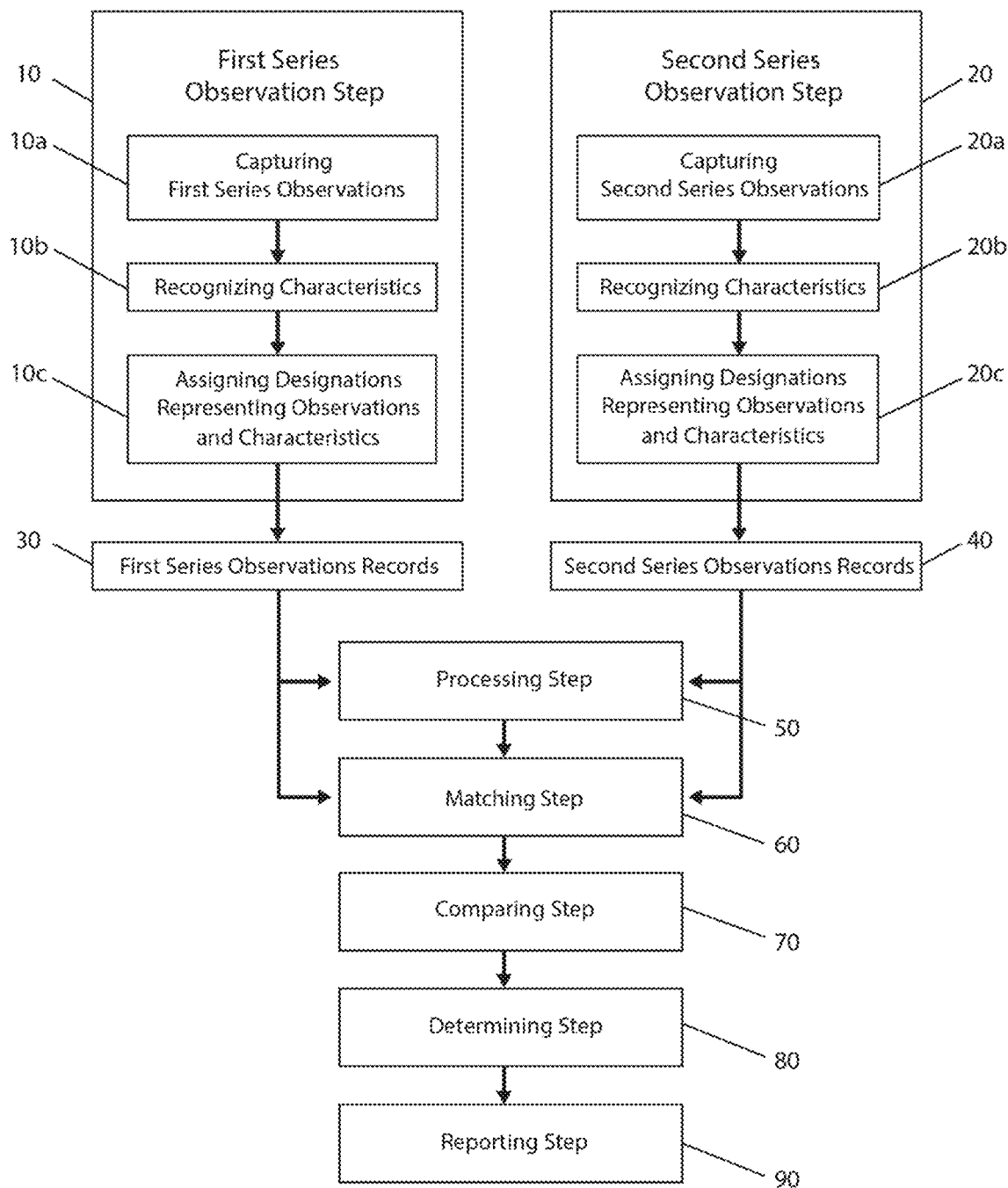
FIG. 1 is a flowchart which illustrates a particular, non-limiting embodiment of the operations of the identity authentication process disclosed herein.

The present disclosure relates generally to a scalable configurable universal complete spectrum identity authentication process that utilizes a unique identity authentication dataset for one specific known person to make at least one identity authentication determination regarding any one specific tested person who claims to be the one specific known person. The present disclosure more particularly relates to an identity authentication process that utilizes at least one computer that is configured to be utilized, at least in part, for authenticating or not authenticating the claimed identity of one specific tested person through its utilizing a file or files containing data that represent the unique cyberspace identity or identifiers for the one specific known person that the tested person claims to be. The identity authentication process utilizes the unique cyberspace identifiers for the one specific known person to authenticate or not authenticate the claimed identity of the one specific tested person. The identity authentication process does so by utilizing predetermined criteria, cyber resources and sensor data or derived data regarding the one specific known person and the one specific tested person; wherein the one specific known person is selected from the spectrum of people who have unique identity authentication datasets and the one specific tested person is selected from the spectrum of people whose claimed identities have been tested by an identity authentication process.

We live in a technologically interconnected world where the vast spectrum of available cyber resources is ever-widening. Over time our technologically interconnected world appears to be destined to provide every possible cyber resource that humanity could ever want or need. Included in those cyber resources, and in accordance with the teachings herein, will be a scalable configurable universal complete spectrum identity authentication process that will be capable of making the presently needed constantly provided 100% accurate identity authentication determinations regarding any one specific person. A further discussion of this universal concept is disclosed in:

U.S. patent application Ser. No. 15/981,785, filed May 16, 2018, issued as U.S. Pat. No. 10,943,097 on Mar. 9, 2021, entitled "Scalable Configurable Universal Full Spectrum Cyber Process That Utilizes Measure Points From Sensor Observation-Derived Representations Or Analytically Rich Sparse Data Sets For Making Cyber Determinations Regarding Or Utilizing Sensor Observations Or Sensor Observations Subjects", now pending, having the same inventor, and which is incorporated herein by reference in its entirety;

U.S. patent application Ser. No. 16/891,080, filed Jun. 3, 2020, issued as U.S. Pat. No. 10,943,693 on Mar. 9, 2021, entitled "Concise Datasets Platform", having the same inventor, and which is incorporated herein by reference in its entirety;

U.S. patent application Ser. No. 17/891,080, filed Feb. 2, 2021, issued as U.S. Pat. No. 11,238,992 on Feb. 1, 2022, entitled "Configurable Concise Datasets Platform", having the same inventor, and which is incorporated herein by reference in its entirety;

U.S. patent application Ser. No. 17/568,083, filed on Jan. 4, 2022, entitled "Sensor Data Analyzing Machine", now pending, having the same inventor, and which is incorporated herein by reference in its entirety;

U.S. patent application Ser. No. 13/702,537 filed on Oct. 19, 2011, issued as U.S. Pat. No. 8,832,794 on Sep. 9, 2014, entitled "Single-Point-of-Access Cyber System", having the same inventor, and which is incorporated herein by reference in its entirety;

U.S. patent application Ser. No. 14/447,283 filed on Jul. 30, 2014, issued as U.S. Pat. No. 9,479,507 on Oct. 25, 2016, entitled "Single-Point-of-Access Cyber System", having the same inventor, and which is incorporated herein by reference in its entirety;

U.S. patent application Ser. No. 15/236,337, filed on Aug. 12, 2016, issued as U.S. Pat. No. 9,660,996 on May 23, 2017, entitled "Point-of-Cyber-Access Cyber System", having the same inventor, and which is incorporated herein by reference in its entirety; and U.S. patent application Ser. No. 15/483,970, filed on Aug. 12, 2016, now pending, entitled "Scalable Configurable Universal Operating System", having the same inventor, and which is incorporated herein by reference in its entirety.

There exists an unanswered need in the current art for an identity authentication process that:

makes identity authentication determinations regarding whether or not one specific tested person is the one specific known person that he or she claims to be;

utilizes any number of observed characteristics of one specific known person or one specific tested person;

utilizes observations of any one specific tested person who is not consciously engaged in the identity authentication process;

makes one-time single event identity authentication determinations regarding any one specific tested person, intermittently made identity authentication determinations regarding any one specific tested person, or constantly made identity authentication determinations regarding any one specific tested person;

utilizes observations where a tested person repeats a portion of a selected previously captured sensor observation of a known person;

utilizes any available useful sensor observation;

utilizes any number of observed characteristics of any one specific known person who is one specific subject of an identity authentication process sensor observation;

utilizes any number of observed characteristics of any one specific tested person who is one specific subject of an identity authentication process sensor observation;

provides or utilizes standard designations for accurately or consistently representing any aspect of the operations of the identity authentication process;

enables absolute security or privacy for any information or resources that are utilized by the identity authentication process or that are utilizing the identity authentication process;

utilizes any useful criteria for observing, recognizing, matching, comparing, processing of observation data, processing of derived data, determining, reporting or any other operations of the identity authentication process;

utilizes observations that were not captured or processed by the identity authentication process;

utilizes useful information of any type from one or more sources;

utilizes at least one recognized characteristic;

utilizes comparisons of at least one matching characteristic to achieve a predetermined attainable identity authentication determination goal; or is scalable in regard to included utilized necessary resources to fall at any one point in a range of from a minimum to a maximum; wherein at a minimum, the identity authentication process includes or utilizes only the resources that are necessary for the making of the least complex of all identity authentication process needs for included or utilized necessary resources; wherein at a maximum, the identity authentication process includes or utilizes all of the resource that are necessary for providing for the most complex of all identity authentication process needs for necessary resources.

A technologically interconnected world that is capable of providing every possible cyber resource humanity could ever want or need can only be built upon the foundation of a secure and safe cyberspace environment or cyberspace ecosystem. Constant real-time utilization of accurate and reliable identity authentication determinations regarding any one specific tested person is an indispensable step in providing a secure and safe cyberspace environment and cyberspace ecosystem.

Therefore, a need exists in the art for a scalable configurable universal complete spectrum identity authentication process that can be configured to constantly make 100% accurate identity authentication determinations regarding the claimed identity of any one specific tested person.

Definitions

The following words or terms have the following meanings indicated when used in the present disclosure.

Absolutely unique: occurring at a ratio of one to the total (non-zero) number of first series observation records.

Biological characteristic: any biological characteristic of one specific person that can be sensor-observed and reported upon.

Unique biological characteristic: any single observable biological characteristic of one specific person or any combination of observable biological characteristics of one specific person (e.g., a biological fingerprint) that can be considered to be unique or absolutely unique to one specific observed person.

Capture/capturing: the use of cyber resources for acquiring and recording cyber sensor observations.

Complete spectrum: the complete set of possible choices for a given variable or option which includes the subset of available choices for any given variable or option. Thus, for example, the complete spectrum of cyber resources is the complete set of possible cyber resources which includes all available cyber resources.

Constant/constantly: occurring at any frequency that provides for essentially continuous uninterrupted identity authentication determinations regarding any one specific tested person.

Criteria: a group of options containing at least one member.

Cyber Portal: a user interface input/output device that is a component of a Single-Point-of-Access Cyber System or a Point-of-Cyber-Access Cyber System.

Derived data: data that is a result of the processing of sensor data or other derived data.

Designation/designations: one or more informational representations regarding one or more sensor observations or one or more sensor observation subjects.

Determination of identity: (a) determination of previously unknown identity or (b) authenticating or not authenticating claimed identity.

Identity determinations: at least one identity determination regarding any one specific tested person; identity tests may be configured to make at least one identity test determination selected from the group consisting of (a) determining that one specific tested person is the exact same person as one specific known person, (b) determining any percentage of probability that exists of one specific tested person being the exact same person as one specific known person or (c) determining that one specific tested person absolutely is not the same person as one specific known person.

Known person: one specific person who is the one specific known subject of at least one first series observation record.

Observation data: data from at least one sensor observation that is utilized by an identity authentication process.

Period of time: any increment of time that is longer than a point in time.

Processing: one or more actions or processes that are made to sensor data or derived data, wherein the processing of sensor data or derived data results in the creation of derived data.

Real time: occurring in a period of time that is so short that it is perceived by a person to have occurred without latency.

Recognized: any aspect of an observation or a subject of an observation that has been identified for further utilization.

Selected from: "from" or "selected from". One skilled in the art will appreciate that the expression "x is selected from the group G", where x is a group member variable and G is the group, is legal terminology (Markush language) which is merely intended to specify possible values for x, and which does not by itself suggest or imply an actual selection step in any methodology or system this terminology is being used to describe.

Series: a group of at least one.

Tested person: one specific person who is one specific subject of at least one second series identity authentication process sensor observation; one specific person who has not currently been determined to be the same person as one specific known person.

Unique: occurring at a selected ratio other than the ratio of absolutely unique.

Overview

In accordance with the teachings herein, unique cyberspace identity datasets regarding any one specific person and a scalable configurable universal complete spectrum identity authentication process are disclosed. Together, the unique cyberspace identity datasets regarding any one specific person and the identity authentication process may accurately and reliably be utilized to make one or more authentication determinations selected from the spectrum of identity authentication determinations. The systems and methodologies disclosed herein for providing unique identity authentication process datasets regarding any one specific person and accurate identity authentication determinations regarding any one specific tested person provide the foundation upon which a secure, safe and private technologically interconnected cyberspace environment or cyberspace ecosystem may be built.

Additionally, through utilization of unique cyberspace identity datasets regarding any one specific person and the accurate or reliable identity authentication determinations regarding any one specific tested person that are disclosed herein, cyberspace may soon change from an environment of unparalleled chaos to a unified and orderly technologically interconnected environment that is configurable for providing all users with reasonable levels of cybersecurity, cyber safety and cyber privacy.

The following list includes a portion of the resources and features from a spectrum of resources and features that are provided by utilization of unique identity datasets regarding any one specific person and the disclosed scalable configurable universal complete spectrum identity authentication process:

a. identity authentication determinations regarding some or all people from a spectrum of tested people who are subjects of identity authentication process sensor observations;

b. identity authentication determinations that utilize some or all aspects from a spectrum of aspects of subjects of identity authentication process sensor observations;

c. identity authentication determinations that fill some or all needs from a spectrum of needs for identity authentication determinations;

d. identity authentication determinations that are made at one or more attainable levels of accuracy including 100%;

e. identity authentication determinations that utilize some or all resources from a spectrum of available useful resources;

f. identity authentication determinations that utilize some or all information from a spectrum of available useful information;

g. identity authentication determinations that utilize some or all sensor observations from a spectrum of available useful sensor observations;

h. identity authentication determinations that utilize some or all observable characteristics of one specific person from a spectrum of observable characteristics of the one specific person;

i. identity authentication determinations that utilize some or all criteria from a spectrum of useful criteria;

j. identity authentication determinations that utilize standard designations for accurately and reliably representing any aspect of the operations of the identity authentication process;

k. identity authentication determinations that are) made one single time, made intermittently or made constantly;

l. utilization of identity authentication determinations for accurately granting or denying any one specific tested person access to at least one member selected from the group consisting of (i) the identity authentication process, (ii) cyber resources that are being utilized by the identity authentication process or (iii) cyber resources that are utilizing the identity authentication process;

m. enabling security or privacy, which may include absolute security or privacy for some or all cyber resources or activities that are utilizing or being utilized by the identity authentication process;

n. identity authentication process sensor observations of a person where the person, as a subject of an observation, may be at any one point in a range of, from the person being observable but not being consciously engaged in an identity authentication process sensor observation, to the person being consciously engaged and participating in an identity authentication process sensor observation;

o. scalability in regard to included or utilized necessary resources, wherein an identity authentication process may be specifically configured to include utilization of only the resources that are necessary to provide for the identity authentication process's needs for necessary resources at any one point in a range from providing for the smallest of all identity authentication process needs in regard to included or utilized necessary resources, to providing for the largest of all identity authentication process needs in regard to included or utilized necessary resources;

p. ease of use in some or all phases of operations;

q. persistence in attempting to achieve selected attainable identity authentication process goals;

r. utilization of one or more sensor-observed visual, physical, behavioral, physiological or biological characteristics of one specific person in making identity authentication determinations regarding one specific tested person;

s. alteration of operations of the identity authentication process or any resources that are being utilized by the identity authentication process for any purpose including the purpose of aiding in achieving at least one identity authentication determination goal;

t. utilization of useful information from any source;

u. utilization of a unique combination of simultaneously occurring sensor-observed characteristics of any one specific person; or v. utilization of a combination of observed characteristics of any one specific person that occur over at least one period of time.

Proper utilization of identity authentication determinations regarding one specific tested person as disclosed herein may, for the first time ever, enable the world to enjoy the benefits of a secure, safe and private technologically interconnected cyberspace environment or cyberspace ecosystem.

One of the benefits that may be derived from the utilization of the identity authentication process disclosed herein is its ability to determine and report on any indicated measure of probability that exists of one specific tested person being the same person as one specific known person. At one end of the spectrum the identity authentication process makes determinations that one specific tested person absolutely is the same person as one specific known person; and at the other end of the spectrum the identity authentication process makes determinations that the one specific tested person absolutely is not the same person as the one specific known person.

Through the utilization of necessary resources and predetermined criteria a preferred embodiment of the identity authentication process disclosed herein provides identity authentication determinations by comparing one specific tested subject of at least one identity authentication process sensor observation with one specific known subject of at least one identity authentication process sensor observation. The identity authentication process utilizes predetermined criteria for every aspect of its operations where criteria are used. The identity authentication process is configurable for providing or utilizing standard designations to represent observations, characteristics or any other aspects of the operations of the identity authentication process.

FIG. 1 depicts a first particular non-limiting embodiment of operations of the disclosed scalable configurable universal complete spectrum identity authentication process in accordance with the teachings herein as used for making identity authentication determinations from a spectrum of identity authentication determinations. The operations of the identity authentication process depicted herein, which uses necessary cyber resources and predetermined criteria, may commence by utilizing all or any part of a first series observation step 10 performed on one specific known person who is one specific subject of at least one identity authentication process sensor observation. The first series observation's step 10 includes capturing at least one first series sensor observation 10a of the one specific known person; recognizing aspects, characteristics, or features 10b from the captured sensor observation; and then assigning designations 10c representing the sensor observation and aspects, characteristics or features of or from the sensor observation of the one specific known person. These designations may be included as data as a part of at least one first series observation record 30, which represents the cyberspace identity or identifiers of the one specific known person.

The identity authentication process may further include utilization of all or any part of a second series observation step 20 performed on one specific tested person who is one specific subject of at least one second series sensor observation. The second series observation step 20 includes capturing at least one second series sensor observation 20a of the one specific tested person, recognizing aspects characteristics or features 20b from the captured sensor observation, and then assigning designations 20c representing the sensor observation and the aspects, characteristics or features from the one specific tested person. These designations may be included as data as a part of at least one second series observation record 40, which represents the cyberspace identity or identifiers of one specific tested person.

The identity authentication process is configurable for interacting with utilized cyber resources to control the operations of those resources for any purpose including the capturing of any possible observations or the providing of any useful variation of the operation of identity authentication process or any identity authentication process utilized cyber resources.

Any step of the operations of the identity authentication process or any portion thereof may be performed in any usable order or sequence.

Operating in any usable order or sequence and utilizing all or any part of at least one of the following steps, the identity authentication process is configurable for:

a. utilizing useful observations or useful information from any source;

b. determining or utilizing the level of identity authentication determination accuracy that has been achieved;

c. determining or utilizing a measure of adequacy of available resources;

d. utilizing cyber resources to capture first series observations or second series observations;

e. recognizing useful aspects, characteristics or features from sensor observations;

f. utilizing recognized aspects, characteristics or features from sensor observations;

g. utilizing at least one unique aspect, characteristic or feature for making identity authentication determinations;

h. assigning designations to recognized aspects, characteristics or features;
i. processing observation data from first series observation records or second series observation records during a processing step 50; the processing of observation data results in the creation of derived data wherein the observation data or the derived data may be utilized in (i) at least one processing step, (ii) at least one matching step, (iii) at least one comparing step or (iv) at least one determining step;
j. determining which or the order in which observation data or derived data will be utilized for processing, matching, comparing or determining;
k. matching observations and recognized aspects, characteristics or features from second series observation records, during a matching step 60, with corresponding comparable observations and recognized aspects, characteristics or features from first series observation records;
l. determining and providing conclusions as to an indicated measure of comparison between aspects or characteristics from second series observation records and aspects or characteristics from first series observation records during a comparing step 70;
m. selecting which conclusions from comparing will be utilized in the making of identity authentication determinations;
n. utilizing (i) observation data, (ii) derived data, (iii) conclusions from comparing or (iv) useful information, in the making of identity authentication determinations;
o. making identity authentication determinations regarding one specific tested person that identify any indicated measure of probability that exists of the one specific tested person and the one specific known person being the same person during a determining step 80; and
p. reporting on any aspect of the operations of the identity authentication process during a reporting step 90.

Additionally, based upon predetermined criteria, the identity authentication process may be persistent in attempting to attain a selected identity authentication determination goal. As an example, should an identity authentication determination, based upon conclusions from comparing a first aspect, characteristic or feature of one specific tested person to one specific comparable aspect, characteristic or feature of the one specific known person that the tested person claims to be not result in the identity authentication process achieving a selected identity authentication determination goal, then the identity authentication process may continue the comparing and determining until the selected identity authentication determination goal is achieved or there are no further first and second series observation records to compare.

Should an identity authentication determination that is based upon conclusions from comparing all available useful aspects, characteristics or features of one specific tested person not result in the making of the selected identity authentication determination goal, then the identity authentication process is configurable for utilizing at least one additional observation of the one specific tested person to add to his or her second series observation records.

The identity authentication process is configurable for selecting a portion of a first series observation record of the one specific known person to be repeated by the one specific tested person for inclusion in the one specific tested person's second series observation records.

In order for the identity authentication process to capture observations that are most likely to aid in achieving selected identity authentication determination goals, the identity authentication process may be configured to alter any operational aspect of the identity authentication process or any alterable cyber resource that the identity authentication process is utilizing.

DESCRIPTION

We live in a technologically interconnected world where vast cyber resources presently exist. Within this technologically interconnected world we utilize cyber resources from a spectrum of available cyber resources. This spectrum is ever-widening, and over time, our technologically interconnected world appears to be destined to provide every possible cyber resource that humanity could ever want or need. When that time comes, the entire body of cyber resources will include—and will rely heavily upon—a scalable configurable universal complete spectrum identity authentication process (such as the scalable configurable universal complete spectrum identity authentication process of the present disclosure) that can be configured for constantly making real-time 100% accurate identity authentication determinations regarding any one specific tested person. In addition, data sets that are utilized by the identity authentication process may also be used in real time or at any time thereafter for making additional determinations regarding the one specific tested person.

The core operations of a preferred embodiment of the disclosed identity authentication process may best be understood through a particular detailed and non-limiting example of the utilization of this identity authentication process for the purpose of accurately making identity authentication determinations regarding the one specific tested person that determine whether or not the one specific tested person and one specific known person the tested person claims to be are the same person. One of many predetermined criteria utilized for performing this cycle of the utilization of identity authentication process is that the identity authentication process's full resources should be utilized in any way possible to persistently work towards accomplishing the selected identity authentication determination goal.

In the following example a "known person" owns a laptop computer. The laptop computer is utilized in part for making one-time identity authentication determinations that are used to exclusively grant only the known person initial access to his or her laptop computer's resources. The laptop computer's resources utilize the identity authentication process. In addition, the laptop computer has a microphone and a camera with adjustable operations that the identity authentication process may adjust.

The identity authentication process utilizes data regarding observations of the known person that come from the known person's first series observation records. The first series observation records of the known person are exclusively made up of observations that include the known person as an observation subject. The known person's first series observation records are comprised of data regarding designations from observations. Data from one specific known person's first series observation records make up the cyberspace identity or identifiers for the one specific known person.

A cycle of the utilization of the identity authentication process is initiated by one specific tested person requesting use of the known person's laptop computer.

Every aspect of the operation of the identity authentication process may utilize criteria that may be determined by the known person, by the operations of the cyber resources that were selected for use, by the identity authentication process, by any other means for selecting criteria or by any combination thereof. Selection of anything may also constitute selecting criteria.

Criteria are selected choices of who, when, where, what, why or how as each relates to any aspect of the operations of the identity authentication process. Providing a choice of any possible criteria and any criteria being possible may be the most important feature that a cyber resources has to offer. The identity authentication process disclosed herein takes full and best advantage of this feature by providing users with the ability to select available identity authentication process criteria.

In this cycle of utilization, the identity authentication process uses predetermined criteria and its camera to capture images of the tested person. The identity authentication process utilizes the zoom feature of the camera to closely frame an image of only the face of the tested person in order to provide an observation that would be the most likely to aid in achieving a selected identity authentication determination goal.

As a part of either series of observations the identity authentication process recognizes useful aspects, characteristics or features from the observations.

The identity authentication process is configurable for providing or utilizing a standard set of designations for accurately and reliably representing any aspects, characteristics or features of the identity authentication process or its operations.

Utilization of one and only one, standard set of designations is an important part of accurately, reliably or consistently making identity authentication determinations while utilizing any available observation or cyber resources from any place on the planet. This approach also preferably implements a strategy of providing, on a worldwide basis, extremely consistent and accurate assignments of standard designations to every recognized aspect, characteristic or feature of or from identity authentication process observations.

Designations that accurately and reliably represent the observations and observed aspects, characteristics or features including designations representing the captured image of the tested person's face are assigned and then included as data in second series observation records of the one specific tested person. In addition, standard designations may be accurately and consistently assigned according to identity authentication process standards so that designations representing observations and recognized aspects, characteristics or features from either series of observations may be universally utilized across the entire technologically interconnected cyberspace environment or cyberspace ecosystem where identity authentication processes are utilized.

The identity authentication process utilizes predetermined criteria for matching data representing aspects, characteristics or features from the tested person's second series observation records with data representing comparable aspects, characteristics or features from at least one comparable first series observation record of the one specific known person that the tested person claims to be.

In this cycle of utilization of the identity authentication process, predetermined criteria call for selecting and then utilizing at least one comparable observation record from the first series observation records of the one specific known person. Further, the at least one selected observation record preferably will be the most likely of all available observation records to aid in accurately achieving the selected identity authentication determination goal.

Through the incredible speed and power of the operations of cyber resources, any large number of criteria may collectively or selectively be utilized for any aspect of the operations of the identity authentication process.

The identity authentication process utilizes parameters such as time, date, temperature, light sources, light levels, the portion of the tested person that was observed and the clarity of observation for matching the second series observation records of the one specific tested person with at least one comparable first series observation record of the one specific known person who is the proprietary user of the laptop computer.

This cycle of utilization of the identity authentication process includes at least one processing step, wherein at least one part of the observation data from at least one second series observation of the one specific tested person is processed in at least one way and the processing results in the creation of derived data. The derived data is then used by the identity authentication process during (a) at least one additional processing step, (b) at least one matching step, (c) at least one comparing step or (d) at least one determining step. In this cycle of utilization of the identity authentication process observation data and derived data are processed and the resulting derived data is used to identify changes in one or more sensor-observable aspects, characteristics or features of the one specific tested person that occurred over one or more periods of time. The changes that occurred were changes that represent some of the sensor observable unique visual, physical, behavioral, physiological or biological characteristics of the one specific tested person.

Matched observation records of the one specific tested person and the one specific known person are compared by the identity authentication process.

Conclusions from comparing data from observation records, observation data, derived data or useful information may be utilized in the making of identity authentication determinations.

As one specific example of use of the identity authentication process, one specific tested person is wearing large dark glasses that prevent the identity authentication process from utilizing any comparison from the entire area of his or her eyes. The one specific tested person is also wearing a hat that covers the area where the tested person has a small scar crossing a pea-sized birthmark. As a result, this unique characteristic cannot be utilized in the making of identity authentication determinations regarding the one specific tested person.

In this case, the conclusion from comparing a first set of matched characteristics did not enable the identity authentication determination goal to be attained. Hence, following predetermined criteria, the identity authentication process is configured to continue utilizing conclusions from the comparison of aspects, characteristics or features until the identity authentication determination goal is attained or until there are no further conclusions to utilize.

Since the determination goal has not been attained, the identity authentication process selects utilization of a further observation of the tested person's left hand. In this example the identity authentication process requests that the tested person fully open his or her left hand in the presence of the laptop computer's camera with their fingernails facing the camera, and then the properly positioned hand is to be closed and opened again fully.

The tested person, still wanting to gain access, complies with the request that was presented on the laptop computer's image display screen.

The identity authentication process utilizes comparisons of data that were derived from observation designations regarding the geometry of movement of, and the visual presence of the moving hand and fingers for making this identity authentication determination.

The selected second series observation record provides an overabundance of visual, physical, behavioral, physiological or biological characteristics that may be utilized in the making of the previously selected identity authentication determination goal, far more than are needed for determining, with 100% accuracy, that the one specific tested person and the one specific known person absolutely are the same person. In the present example, just a portion of the characteristics that were recognized from the opening and closing of a single finger could have been used to achieve the selected identity authentication determination goal.

Once the identity authentication determination goal has been reached, the identity authentication process is configured to record the determination to a history that it maintains. Having determined that the one specific tested person absolutely is the proprietary user of the laptop computer, the tested person is then granted access to use of his or her laptop computer's resources. History or any other aspect of the operations of the identity authentication process may be stored in volatile or non-volatile memory, e.g., in one or more storage modules that are utilized by one or more computers.

Figure 2:
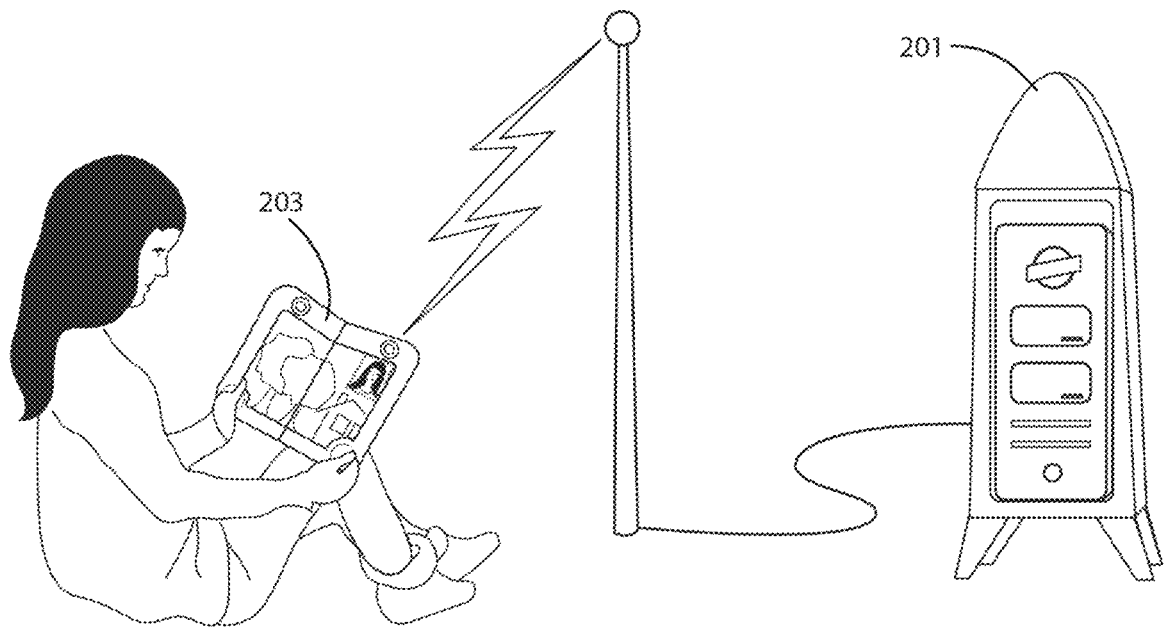
FIG. 2 depicts a particular non-limiting embodiment of a person utilizing a cyber portal for gaining access to a remotely located point of cyber access computer.

FIG. 2 depicts a particular non-limiting embodiment of a person utilizing a cyber portal for gaining access to her remotely located point of cyber access computer, wherein the identity authentication process is utilized for constantly making identity authentication determinations regarding one specific tested person. The point of cyber access computer and the cyber portal are components of the "Single-Point-of-Access Cyber System" and the "Point-of-Cyber-Access Cyber System".

To best demonstrate a few further utilizations of the systems and methodologies disclosed herein consider the future which may be illustrated with reference to the Single-Point-of-Access Cyber System. The Single-Point-of-Access Cyber System is a technologically interconnected cyberspace environment or cyberspace ecosystem that may provide for the fullest and best utilization of a scalable configurable universal complete spectrum identity authentication process such as the identity authentication process of this disclosure.

The Single-Point-of-Access Cyber System architecture provides for each person to proprietarily utilize a remotely accessible point of cyber access computer 201. Each person may utilize any mobile or stationary remote terminal-type of user interface device that is called a cyber portal 203 to gain secure and private access to his or her own remotely located point of cyber access computer 201.

An identity authentication process may be configured to be utilized by a person's own remotely located point of cyber access computer. The identity authentication process disclosed herein is configurable for making identity authentication determinations with a high degree of accuracy, up to and including 100% accuracy. In this example, when 100% accuracy has been achieved, the one specific tested person will be determined to absolutely be the same person as the one specific known person who is the proprietary user of the remotely located point of cyber access computer, an event which must occur before the one specific tested person is granted access to the personal and private resources of his or her own point of cyber access computer. In addition, the one specific known person who is the proprietary user of the point of cyber access computer must also constantly pass his or her identity authentication test to maintain continued access to its resources.

Enabled by the identity authentication determinations of the disclosed identity authentication process, the Single-Point-of-Access Cyber System may provide a technologically interconnected world with a cyberspace environment or cyberspace ecosystem that has the highest attainable levels of cybersecurity, cyber safety and cyber privacy.

A cycle of utilization of the identity authentication process is initiated by a yet-to-be-tested person who utilizes any cyber portal 203 to call up one specific remotely located point of cyber access computer and request access to its personal and private resources.

Each person's point of cyber access computer may be configured to where only one specific person, the point of cyber access computer's proprietary user, may gain access to its personal or private resources and only after that one specific person has, with 100% accuracy, been determined to be the proprietary user of the point of cyber access computer. In this instance the identity authentication process requests, through use of the cyber portal's image display screen 215, that the one specific tested person repeat a phrase that has been randomly selected from the first series observation records of the point of cyber access computer's proprietary user.

The identity authentication process may utilize any criteria for selecting the phrase to be repeated. For example, in this instance the phrase to be repeated was selected based upon camera observations from the utilized cyber portal in regard to light levels, light source, pose, camera angle, movement of the one specific tested person, movement of the cyber portal, background noise and a number of other criteria.

The tested person repeats the selected phrase for the microphone 213 and camera 211 of the cyber portal 203. The identity authentication process controls the operations of the microphone 213 and the pan, tilt and zoom modes of the camera 211 of the cyber portal in order to capture the optimum second series observation of the one specific tested person.

The identity authentication process recognizes aspects, characteristics and features from this observation and accurately assigns standard designations to them. The designations representing the observation and recognized aspects, characteristics and features are included as data in the one specific tested person's second series observation records.

Data representing the designations from the repeating of the selected phrase are then compared utilizing the predetermined criteria of first matching the peak and valley graph representations of the sound of the voice from the repeating with the peak and valley graph representations of the voice from the one specific known person speaking the phrase that was repeated. Then, if a match exists, the identity testing machine further compares the position of the mouth at various points in time such as, for example, at the points in time when there are high peaks in the peak and valley voice graph.

In this instance the one specific tested person requesting access absolutely is the one specific known person who is the proprietary user of the point of cyber access computer and the proprietary user is thereby granted exclusive initial access to its personal and private resources.

It is best to utilize environment-wide criteria that provide a person with secure, safe and private access to his or her own remote or local computer or other cyberspace resources. To achieve this secure, safe and private cyberspace environment or cyberspace ecosystem, it is desirable to utilize criteria that require 100% accurate identity authentication determinations be made and passed by one specific tested person before granting that one specific tested person access to his or her own computer or available cyber resources. It is further recommended that criteria be utilized that require constant continued 100% accurate identity authentication determinations be made of the same specific tested person while he or she continues to utilize, in any way, his or her own computer or available cyberspace resources.

The Single-Point-of-Access Cyber System not only requires that a person be accurately determined to be the proprietary user of his or her point of cyber access computer before the person may gain access to its personal or private resources, but also the Single-Point-of-Access Cyber System preferably requires the person utilizing his or her point of cyber access computer be constantly determined to be its proprietary user during the entire period of time that he or she is using its resources in any way.

One example of how the identity authentication process may constantly make identity authentication determinations utilizes sequential video images of the face of the one specific person who is the user of a cyber portal. Predetermined criteria call for real-time comparison of second series observation data representing aspects, characteristics or features from sequential images of the one specific tested person's face with matching data representing comparable aspects, characteristics or features from first series observations of the proprietary user of the point of cyber access computer. Additionally, for this cycle of utilization of the identity authentication process, predetermined criteria call for 100% accurate identity authentication determinations to constantly be made and passed.

If it is not possible to utilize the prior strategies for making constant determinations of identity of the user of a cyber portal, then the identity authentication process may be configured to utilize any possible aspects, characteristics or features of or from sensor observations of the tested person who is the user of a cyber portal to constantly and persistently attempt to accomplish 100% accurate identity authentication determinations that the tested person is the proprietary user of the point of cyber access computer.

Looking to the present again and more particularly cybersecurity's present need for an easy to use versatile identity authentication process that can be configured to constantly provide 100% accurate identity authentication determinations, it is clear that prior art's cyber identity testing fails to meet present needs for 100% accurate identity authentication determinations. This is the case because prior art cyber determinations of identity do not identify each one specific person by utilizing unique visual, physical, behavioral, physiological or biological characteristics of the person that cannot be replicated by any others. The identity authentication process of the present disclosure is configurable for making determinations of claimed identity of any one specific tested person by utilizing unique visual, physical, behavioral, physiological or biological characteristics of the tested person and the known person. These characteristics are preferably of a type that cannot be replicated by any other person or device.

The scalable configurable universal complete spectrum identity authentication process as utilized for making 100% accurate identity authentication determinations regarding any one specific person, preferably utilizes as many unique visual, physical, behavioral, physiological or biological aspects, characteristics or features of a person as are necessary to achieve an attainable selected identity authentication determination accuracy goal. Many examples of aspects, characteristics or features of a person have previously been addressed. When internal and external sensor observations (which may observe visual, physical, behavioral, physiological or biological characteristics) of a person are utilized, a very large number of possible unique combinations of aspects, characteristics or features may be utilized for making identity authentication determinations regarding any one specific person. With every unique sensor-observable visual, physical, behavioral, physiological or biological, characteristic or feature of a person that exists is a means for accurately making identity authentication determinations by comparing second series observation data of one specific tested person to data from the first series observation records of the one specific known person the tested person claims to be.

One of the greatest concerns of those who are skilled in the art of making easy to use, visual, physical, behavioral, physiological or biological-based determinations of identity of a person is that the utilized information that makes up the cyberspace identity or identifiers of any one specific person may be stolen and then used fraudulently or maliciously. The identity authentication process of this disclosure is configurable for making identity authentication determinations regarding any one specific person by utilizing unique visual, physical, behavioral, physiological or biological aspects, characteristics or features of the one specific person that can never be replicated by others. In many instances, a unique combination of a number of visual, physical, behavioral, physiological or biological aspects, characteristics or features of one specific person that are observed simultaneously or over one or more periods of time may be utilized for accurately or reliably making identity authentication determinations.

Once again, looking to the future of humanity's use of cyber resources, there may come a time when humanity responsibly utilizes cyber resources as a tool to regularly augment each person's own natural cognitive and observational capabilities.

For any one person to achieve the highest attainable levels of benefits from utilization of cyber resources for augmenting his or her own natural cognitive and observational capabilities it is desirable to first provide the person with a relationship of access to utilized cyber resources that is almost identical to the relationship of access the person has with his or her own mind and senses.

Therefore, it is desirable that personal and private cyber information and resources be configured to where they can, through use of the disclosed identity authentication process, only be accessed by that one specific person. As an example, a person may not want to be hypnotized for the purpose of others using information from the privacy of the person's mind for any reason. The person may also not want any others to gain access to his or her own personal and private cyberspace resources and information, including health records, financial information, geographical locating reports, cyberspace communications of all kinds and cyberspace interactions of all kinds (including for commerce, education, entertainment, self-help and so forth). Similarly, a person may not want any others to gain access to all or any part of the person's private cyber resources and information postmortem, just as it is with the person's own natural cognitive resources.

Through use of the disclosed identity authentication process and a point of cyber access computer it may be possible, as it also is with a person's own biological capabilities, to share any selected portion of the person's own personal and private information or resources with selected others.

One skilled in the art will appreciate that some of the methodologies disclosed herein may be implemented utilizing one or more software programs. Such software programs may take the form of suitable programming instructions disposed in a tangible non-transient medium which, when implemented by one or more computer processors, perform part or all of the methodologies described herein.

While the disclosed scalable configurable universal complete spectrum identity authentication process has been defined in terms of its preferred and alternative embodiments, those of ordinary skill in the art will understand that numerous other embodiments and applications of the disclosed identity authentication process will become apparent. Such other embodiments and applications shall be included within the scope and meaning of the disclosure as defined by the appended claims. Moreover, it is to be understood that the above description of the present disclosure is illustrative and is not intended to be limiting. It will thus be appreciated that various additions, substitutions and modifications may be made to the above-described embodiments without departing from the scope of the present disclosure. Accordingly, the scope of the present disclosure should be construed in reference to the appended claims.

What is claimed is:

1. A scalable configurable universal full spectrum identity authentication process, said identity authentication process comprising utilizing:
   (a) at least one computing device,
   (b) at least one sensor observation,
   (c) criteria selected from the spectrum of criteria that may be utilized by said identity authentication process,
   (d) selected useful information,
   (e) selected necessary programming,
   (f) necessary resources, and
   (g) identity tests,
   all of which are configured and utilized for making of at least one identity authentication determination as to whether or not one specific tested person is a one specific known person that the tested person claims to be;
   wherein said identity authentication process utilizes all or part of resources of said at least one computing device;
   wherein said at least one utilized computing device includes at least one tangible, non-transient memory device and at least one input device or at least one output device;
   wherein said identity authentication process is configurable and may be configured for utilization in at least one configuration;
   wherein said identity authentication process's identity tests are selected from a spectrum of identity tests that utilize sensor observations of people in making of authentication determinations as to whether or not one specific tested person is the one specific known person that the tested person claims to be;
   wherein said one specific tested person is from a spectrum of people who claim to be a specific known person;
   wherein said any other necessary resources are selected from a spectrum of other resources that may be necessary for said identity authentication process to utilize;
   wherein said identity authentication process is utilizable under at least one sensor observation circumstance selected from a spectrum of sensor observation circumstances;
   wherein said necessary programming is selected from a spectrum of programming that may be necessary for said identity authentication process to utilize;
   wherein said identity authentication process utilizes useful information from at least one point in time or from over at least one period of time;
   wherein said useful information is selected from a spectrum of information that may be utilized by said identity authentication process;
   wherein said spectrum of useful information includes information that was from or was derived from at least one sensor observation;
   wherein said at least one sensor observation provides useful information regarding at least one aspect of (1) at least one sensor observation, (2) one specific known person, and (3) one specific tested person;
   wherein at least one aspect of the one specific known person or the one specific tested person is selected from a spectrum of sensor-observable aspects of people;
   wherein said identity authentication process utilizes at least one observed characteristic regarding said at least one aspect of said one specific known person or said one specific tested person in the making of at least one identity authentication determination;
   wherein said at least one observed characteristic is selected from a spectrum of sensor-observable characteristics of people;
   wherein said identity authentication process is configurable for utilizing at least one type of sensor observation selected from the group consisting of (a) visual sensor observations, (b) audible sensor observations, (c) thermal sensor observations, (d) olfactory sensor observations, (e) tactile sensor observations, (f) chemical sensor observations, or (g) any other types of sensor observations that may be utilized by said identity authentication process;
   wherein said at least one sensor observation may have at least one characteristic that is utilizable by said identity authentication process;
   wherein said at least one characteristic is selected from a spectrum of characteristics of sensor observations that may be utilized by said identity authentication process;
   wherein said identity authentication process is scalable in regard to included or utilized resources and its included or utilized resources fall at one point in a range of from a minimum to a maximum;
   wherein at its minimum, said identity authentication process includes or utilizes only the resources that are necessary for providing for a least complex, in regard to included or utilized resources, of all identity authentication process needs for included or utilized resources; and at its maximum, said identity authentication process includes or utilizes all of the resources that are necessary for providing for the making of a most complex, in regard to included or utilized resources, of all identity authentication process needs for included or utilized resources;
   wherein said identity authentication process is configurable for determining or utilizing at least one measure of adequacy of available resources;
   wherein said identity authentication process is configurable for determining or utilizing at least one measure of adequacy of available useful information;

wherein said identity authentication process is configurable for determining or utilizing at least one measure of accuracy of at least one identity authentication determination;

wherein said identity authentication process is configurable for making at least one type of identity authentication determination selected from the group consisting of (1) identity authentication determinations that are made as single events, (2) intermittently made identity authentication determinations or (3) constantly made identity authentication determinations, regarding whether or not one specific tested person is the one specific known person that the tested person claims to be;

wherein said identity authentication process is configurable for authenticating an identity of any one specific tested person in real time or at any time thereafter; and wherein said identity authentication process is further configurable for utilizing at least one part of at least one step selected from the group consisting of (a) a first series observation step, wherein said identity authentication process utilizes at least one sensor observation, wherein one specific known person is one specific subject of said at least one sensor observation, wherein said one specific known person has at least one specific sensor-observable aspect, wherein said identity authentication process recognizes at least one characteristic regarding said at least one specific aspect, wherein said at least one recognized characteristic is utilizable by said identity authentication process in the making of at least one identity authentication determination regarding said one specific known person, wherein said identity authentication process utilizes at least one designation from said at least one sensor observation or assigns at least one designation representing (i) said at least one sensor observation, (ii) said at least one sensor-observed aspect of said one specific known person, or (iii) said at least one sensor-observed characteristic regarding said at least one sensor-observed aspect, wherein said identity authentication process includes said at least one designation, as data, in at least one first series observation record of said one specific known person, (b) a second series observation step, wherein said identity authentication process utilizes at least one sensor observation, wherein one specific tested person is one specific subject of said at least one sensor observation, wherein said one specific tested person has at least one specific sensor-observable aspect, wherein said identity authentication process recognizes at least one characteristic regarding said at least one specific aspect, wherein said at least one recognized characteristic is utilizable by said identity authentication process in the making of at least one identity authentication determination regarding said one specific tested person, wherein said identity authentication process utilizes at least one designation from said at least one sensor observation or assigns at least one designation representing (i) said at least one sensor observation, (ii) said at least one sensor-observed aspect of said one specific tested person, or (iii) said at least one characteristic regarding said at least one sensor-observed aspect, wherein said identity authentication process includes at least one designation, as data, in at least one second series observation record of said one specific tested person, (c) a processing step, wherein at least one designation from said at least one first series observation record, or at least one designation from said at least one second series observation record are stored or utilized as data, wherein at least part of said data from said at least one first series observation step or said at least one second series observation step is processed utilizing at least one method, process, procedure, or formula, wherein said at least one method, process, procedure, or formula is selected from a spectrum of methods, processes, procedures, or formulas that may be utilized in the processing of data from first series observation steps or from second series observation steps, wherein the processing of said observation data or derived data results in the creation of derived data, wherein said observation data or said derived data is utilizable for at least one purpose selected from a spectrum of purposes for which said observation data or said derived data may be utilized, wherein said at least one purpose includes utilizing said observation data or said derived data in the making of at least one identity authentication determination as to whether or not one specific tested person is the same person as the one specific known person that the tested person claims to be, wherein at least one part of said observation data or said derived data is utilizable by said identity authentication process in at least one part of at least one step selected from the group consisting of (i) at least one processing step, (ii) at least one matching step, (iii) at least one comparing step, or (iv) at least one determining step, (d) a matching step, wherein observation data or derived data from at least one second series observation record of the one specific tested person is matched with comparable observation data or derived data from at least one first series observation record of the one specific known person that the tested person claims to be, (e) a comparing step, wherein said identity authentication process compares observation data or derived data from at least one second series observation record of the one specific tested person with comparable observation data or derived data from at least one first series observation record of the one specific known person the tested person claims to be and provides at least one conclusion from the comparing, (f) a determining step, wherein said identity authentication process utilizes at least one member selected from the group consisting of (i) at least one part of said at least one conclusion from said at least one comparing step, (ii) at least one part of said observation data, (iii) at least one part of said derived data, or (iv) selected useful information, in the making of said at least one identity authentication determination, and (g) a reporting step, wherein said identity authentication process provides at least one selected report regarding at least one part of at least one cycle of utilization of said identity authentication process.

2. The identity authentication process of claim 1, wherein at least one part of said observation data or said derived data from at least one first series observation record of one specific known person is utilized as said one specific known person's cyberspace identity or identifiers;
wherein said one specific known person's cyberspace identity or identifiers are unique to said one specific known person; and
wherein at least one part of said observation data or said derived data from at least one first series observation record for any other one specific known person is utilizable as the cyberspace identity or identifiers for said any other one specific known person, and said cyberspace identity or identifiers are unique to each one specific other known person.

3. The identity authentication process of claim 1, wherein said identity authentication process achieves at least one selected attainable percentage of accuracy goal for at least one identity authentication determination; and
wherein said at least one attainable percentage of accuracy goal falls within a range extending from 0% accuracy up to, and including, 100% accuracy.

4. The identity authentication process of claim 1, wherein said identity authentication process is utilizable at any possible level of observation participation by the one specific tested person or the one specific known person; and
wherein said any possible level of observation participation ranges from said one specific tested person or said one specific known person being sensor-observable but not being consciously or otherwise engaged in at least one identity authentication process sensor observation, to said one specific tested person or said one specific known person being an active and consciously engaged participant in at least one identity authentication process sensor observation.

5. The identity authentication process of claim 1, wherein said at least one sensor observation occurs over at least one period of time and said sensor observations include at least one observed change that occurs over said at least one period of time to at least one member selected from the group consisting of: (a) at least one sensor-observable aspect of said sensor observation, (b) at least one sensor-observable aspect of the one specific known person who is one specific first series known person, or (c) at least one sensor-observable aspect of the one specific tested person;
wherein said identity authentication process is configurable for utilizing said at least one sensor-observed change that occurs over said at least one period of time in the making of at least one identity authentication determination.

6. The identity authentication process of claim 5, wherein said at least one observed change that occurs over said at least one period of time includes at least one change to at least one aspect of at least one feature of one specific person; and
wherein said at least one feature of said one specific person is selected from the group consisting of said one specific person's: head, face, mouth, eyes, eyebrows, nose, arms, hands, fingers, legs, feet, neck, torso, skin, heart, stomach, intestines, liver, kidneys, lungs, respiration, breath, vascular system, brain, spinal cord, neural system, skeleton, blood or any other feature of a person selected from a spectrum of features of people where sensor-observable changes occur over time.

7. The identity authentication process of claim 1, wherein all or part of said observation data or said derived data from said at least one first series observation record of said one specific known person or said at least one second series observation record of said one specific tested person are included as a part of said spectrum of useful information.

8. The identity authentication process of claim 1, wherein at least one identity authentication determination includes at least one determination of any indicated percentage of probability that exists of one specific tested person being the same person as the one specific known person that the tested person claims to be:
wherein said at least one identity authentication determination ranges from determining that a 0% probability exists of said one specific tested person being said one specific known person, through determining any intermediate indicated percentage of probability that exists of said one specific tested person being said one specific known person, to determining there is a 100% probability that said one specific tested person absolutely is said one specific known person that the tested person claims to be.

9. The identity authentication process of claim 1, wherein said identity authentication process further includes a repeating step;
wherein said identity authentication process selects at least one part of at least one first series observation of the one specific known person that the tested person claims to be for repetition by the one specific tested person;
wherein said one specific tested person is sensor-observed performing said at least one repetition;
wherein said identity authentication process utilizes at least one designation from the repetition observation or assigns at least one designation representing at least one member selected from the group consisting of: (a) said at least one sensor observation, (b) said at least one repetition, (c) at least one sensor-observable aspect of said one specific tested person, or (d) at least one characteristic regarding said at least one sensor-observable aspect of said one specific tested person; and
wherein said identity authentication process includes at least one designation in at least one second series observation record of said tested person.

10. The identity authentication process of claim 1, wherein said identity authentication process is further configured for searching and utilizing available first series observation records of the one specific known person that the tested person claims to be until either an identity authentication determination goal for the one specific tested person has been achieved, or there are no further comparable first series observation records to search or utilize.

11. The identity authentication process of claim 1, wherein said identity authentication process utilizes useful information from at least one source other than at least one member selected from the group consisting of: (a) at least one first series observation record of the one specific known person that the tested person claims to be or (b) at least one second series observation record of the one specific tested person.

12. The identity authentication process of claim 1, wherein said identity authentication process utilizes said selected criteria, said selected useful information, said selected programming, and said any other necessary resources for the purpose of making identity authentication determinations that are utilized, at least in part, to determine whether to allow, or to deny the one specific tested person access to at least one part of at least one resource selected from the group consisting of: (a) said identity authentication process, (b) at least one resource that is being utilized by said identity authentication process, or (c) at least one resource that is utilizing said identity authentication process.

13. The identity authentication process of claim 1, wherein said identity authentication process manipulates at least one operation of resources that are being utilized by said identity authentication process, or said identity authentication process itself;
　　wherein said manipulating provides said identity authentication process with selection of possible utilizations;
　　wherein said manipulating is utilized for at least one purpose;
　　wherein said at least one purpose for utilizing said manipulating includes aiding in achieving at least one selected identity authentication determination goal.

14. The identity authentication process of claim 1, wherein said identity authentication process further includes identity authentication process history, wherein said history includes at least one history record of, or from the operations of said identity authentication process.

15. The identity authentication process of claim 1, wherein at least one part of at least one observation record for one specific known person that was derived from at least one source other than at least one first series observation step is included as at least one part of at least one first series observation record for said one specific known person.

16. The identity authentication process of claim 1, wherein at least one part of at least one observation record for the one specific tested person that was derived from at least one source other than at least one second series observation step is included as at least one part of at least one second series observation record for said one specific tested person.

17. The identity authentication process of claim 1, wherein the operations of said identity authentication process, or any part thereof, are performed in any usable order.

18. The identity authentication process of claim 1, wherein said identity authentication process includes at least one standard identity authentication process designation representing at least one part of at least one aspect of at least one operation of said identity authentication process.

19. A scalable, configurable, universal, full spectrum identity authentication process, comprising:
　　utilizing useful information from at least one point in time or over at least one period of time, wherein said useful information being from a spectrum of information that includes at least one observed characteristic of one specific person who is one specific subject of at least one identity authentication process sensor observation,
　　wherein said at least one sensor observation is a type of sensor observation selected from the group consisting of (a) visual sensor observations, (b) audible sensor observations, (c) thermal sensor observations, (d) olfactory sensor observations, and (e) tactile sensor observations,
　　wherein said identity authentication process makes at least one identity authentication determination as to whether or not one specific tested person is a same person as a one specific known person that the tested person claims to be, which is accomplished by utilizing (a) at least one computing device, (b) criteria that may be utilized by said identity authentication process, (c) selected useful information, and (d) any necessary programming or resources,
　　wherein said identity authentication process provides at least one duration of identity authentication determinations selected from the group consisting of (i) at least one single event identity authentication determination that is made at one specific point in time, (ii) at least one set of intermittently made identity authentication determinations, and (iii) at least one set of constantly made identity authentication determinations,
　　wherein said identity authentication determinations are utilized for at least one purpose,
　　wherein said identity authentication process further comprises utilizing at least one part of at least one step selected from the group consisting of
　　(a) a first series observation step utilizing at least one sensor observation, wherein one specific known person has at least one sensor-observable aspect, said identity authentication process recognizes at least one characteristic regarding said at least one sensor-observed aspect, said at least one recognized characteristic is utilizable by said identity authentication process in making at least one identity authentication determination, said identity authentication process utilizes at least one designation from said at least one sensor observation, or assigns at least one designation representing (i) said at least one sensor observation, (ii) said at least one sensor-observed aspect of said one specific known person, and (iii) said at least one recognized characteristic, said identity authentication process includes at least one of said designations, as data, in at least one first series observation record of said one specific known person,
　　(b) a second series observation step utilizing at least one sensor observation,
　　wherein one specific tested person has at least one sensor-observable aspect, said identity authentication process recognizes at least one characteristic regarding the at least one sensor-observed aspect, said at least one recognized characteristic is utilizable by said identity authentication process in making at least one selected identity authentication determination, said identity authentication process utilizes at least one designation from said at least one sensor observation, or assigns at least one designation representing (i) said at least one sensor observation, (ii) at least one sensor-observed aspect regarding said one specific tested person, and (iii) said at least one characteristic regarding said at least one aspect, wherein said identity authentication process includes at least one of said designations, as data, in at least one second series observation record of said one specific tested person,
　　(c) a processing step, wherein at least one designation from said at least one first series observation record, or at least one designation from said at least one second series observation record is stored or utilized as data, wherein all or part of said observation data representing said at least one designation from said first series observation step, or said second series observation step may be processed in at least one way, said at least one way is selected from the group consisting of a complete spectrum of ways that observation data may be processed for utilization by said identity authentication process, wherein said processing of said observation data results in creation of derived data, wherein said observation data or said derived data may be utilized for at least one purpose selected from the group consisting of a complete spectrum of purposes that said observation data or said derived data may be utilized, said at least one purpose includes being utilized by said identity authentication process in making at least one selected identity authentication determination as to whether or not a tested person is a same person as a known person that the tested person claims to be, wherein at least one part of said observation data or said derived data may be included as at least one part of said useful information, and at least one part of said observation data or said derived data may be utilized by said identity authentication process during at least one part of at least one step selected from the group consisting of at least one processing step, at least one matching step, at least one comparing step, or at least one determining step, (d) a matching step, matching sensor observation data or derived data regarding the one specific tested person with comparable sensor observation data or derived data from at least one first series observation record of the one specific known person the tested person claims to be, (e) a comparing step, comparing sensor observation data or derived data from at least one second series observation record of the one specific tested person with sensor observation data or derived data from at least one comparable first series observation record of the one specific known person that the tested person claims to be, and providing at least one conclusion from said comparing, (f) a determining step, wherein said identity authentication process utilizes at least one member selected from the group consisting of (i) said at least one conclusion from said at least one comparing step, (ii) said sensor observation data or said derived data from said first series observation records of the one specific known person, or said second series observation records of the one specific tested person and (iii) said useful information, for making said at least one identity authentication determination, and (g) a reporting step, providing at least one selected report regarding or utilizing at least one part of at least one cycle of utilization of said identity authentication process.

20. A scalable configurable universal complete spectrum identity authentication process for making identity authentication determinations regarding whether or not one specific tested person is a same person as a one specific known person that the tested person claims to be, the identity authentication process comprising:

performing identity authentication testing processes on specific sensor observation subjects by utilizing (a) at least one computing device, (b) at least one sensor, (c) criteria selected from the group consisting of criteria that may be utilized by said identity authentication process, (d) selected useful information, (e) selected necessary programming, and (f) any other necessary resource, wherein identity authentication tests are utilized by said identity authentication process, said identity authentication tests are selected from the group consisting of a complete spectrum of types of identity authentication tests that may be utilized for making authentication determinations regarding a claimed identity of any one specific tested person, wherein said any other necessary resources are selected from the group consisting of a complete spectrum of other resources that may be necessary for said identity authentication process to utilize, wherein said identity authentication process is utilizable under at least one set of identity authentication test circumstances selected from the group consisting of a complete spectrum of circumstances under which identity authentication testing may be performed, wherein said identity authentication testing is utilized for at least one purpose selected from the group consisting of a complete spectrum of purposes for which identity authentication testing may be utilized, wherein said necessary programming is selected from the group consisting of a complete spectrum of programming that may be utilized by said identity authentication process, wherein said identity authentication process utilizes useful information from at least one point in time, or from over at least one period of time, wherein said useful information is selected from the group consisting of a complete spectrum of information that may be utilized by said identity authentication process, wherein said complete spectrum of useful information includes information that was from, or that was derived from, at least one sensor observation;

wherein said at least one sensor observation provides useful information regarding at least one aspect of at least one member selected from the group consisting of (a) said at least one sensor observation, (b) said one specific known person or (c) said one specific tested person, wherein said one specific tested person is one specific subject of at least one sensor observation, wherein said at least one aspect of said one specific known person, or said one specific tested person is selected from the group consisting of a complete spectrum of sensor-observable aspects of people who are subjects of sensor observations, wherein said identity authentication tests utilize at least one observed characteristic regarding at least one aspect of (1) said one specific known person, and (2) said one specific tested person, wherein said at least one observed characteristic is selected from the group consisting of a complete spectrum of sensor-observable characteristics of people who are subjects of sensor observations, wherein said identity authentication tests utilize at least one type of sensor observation selected from the group consisting of (a) visual sensor observations, (b) audible sensor observations, (c) thermal sensor observations, (d) olfactory sensor observations, and (e) tactile sensor observations, wherein at least one sensor observation has at least one characteristic that may be utilized by said identity authentication process, said at least one characteristic being selected from the group consisting of a complete spectrum of characteristics of sensor observations that may be utilized by said identity authentication process, wherein said identity authentication process utilizes necessary resources, and is scalable in regard to included necessary resources, wherein said included necessary resources fall at one point in a range of from a minimum to a maximum, wherein at the minimum said identity authentication process includes only the resources that are necessary for providing for a least complex, in regard to included necessary resources, of all identity authentication process needs for resources, and wherein at the maximum said identity authentication process includes all of the resources that are necessary for providing for a most complex, in regard to included necessary resources, of all identity authentication process needs for resources, wherein said identity authentication process may be configured for determining or utilizing at least one measure of adequacy of available resources, wherein said identity authentication process may be configured for determining or utilizing at least one measure of adequacy of available useful information, wherein said identity authentication process may be configured for determining or utilizing at least one measure of accuracy of at least one identity authentication test determination, wherein said identity authentication process makes at least one duration of identity authentication test determinations selected from the group consisting of (a) at least one single event identity authentication test determination regarding one specific tested person that was made at one specific point in time, (b) at least one set of intermittently provided identity authentication test determinations regarding one specific tested person, and (c) at least one set of constantly provided identity authentication test determinations regarding one specific tested person, wherein said identity authentication process is configurable for testing or authenticating a claimed identity of any one specific tested person in real time, or at any time thereafter, and wherein said identity authentication process is further configurable for utilizing at least one part of at least one step selected from the group consisting of (a) a first series observation step, wherein said identity authentication process utilizes at least one sensor observation, wherein said one specific known person is one specific subject of said at least one sensor observation, wherein said one specific known person has at least one specific sensor-observable aspect, said identity authentication process recognizes at least one characteristic regarding said at least one specific aspect, said at least one recognized characteristic is utilizable by said identity authentication process in making at least one identity authentication test determination, said identity authentication process utilizes at least one designation from said at least one sensor observation or assigns at least one designation representing
  (i) said at least one sensor observation,
  (ii) said at least one sensor-observed aspect of said one specific known person, and
  (iii) said at least one sensor-observed characteristic regarding said at least one specific observed aspect,
wherein said identity authentication process includes said at least one designation, as data, in at least one first series observation record of said one specific known person, (b) a second series observation step, wherein said identity authentication process utilizes at least one sensor observation, wherein one specific tested person is one specific subject of said at least one sensor observation, wherein said one specific tested person has at least one specific sensor-observable aspect, said identity authentication process recognizes at least one characteristic regarding said at least one specific aspect, said at least one recognized characteristic is utilizable by said identity authentication process in making at least one identity authentication test determination regarding said one specific tested person, said identity authentication process utilizes at least one designation from said at least one sensor observation or assigns at least one designation representing
  (i) said at least one sensor observation,
  (ii) said at least one sensor-observed aspect of said one specific tested person, and
  (iii) said at least one characteristic regarding said at least one sensor-observed aspect,
wherein said identity authentication process includes said at least one designation, as data, in at least one second series observation record of said one specific tested person, (c) a processing step, wherein at least one part of said data representing said at least one designation from said at least one first series observation step or said at least one second series observation step may be processed in at least one way, said at least one way is selected from the group consisting of a complete spectrum of ways said data from said first series observation step, or said second series observation step may be processed for utilization by said identity authentication process, wherein processing of said observation data results in creating of derived data, wherein said observation data or said derived data are utilizable for at least one purpose selected from the group consisting of a complete spectrum of purposes that said observation data or said derived data may be utilized, wherein said at least one purpose includes said observation data or said derived data being utilized by said identity authentication process in making at least one identity authentication test determination regarding said one specific tested person, wherein at least one part of said observation data or said derived data may be utilized by said identity authentication process in at least one part of at least one step selected from the group consisting of at least one processing step, at least one matching step, at least one comparing step, and at least one determining step, (d) a matching step, wherein said identity authentication process matches said observation data or said derived data from at least one second series observation record of said one specific tested person with comparable observation data or derived data from at least one first series observation record of the one specific known person that the tested person claims to be, (e) a comparing step, wherein said identity authentication process compares observation data or derived data from at least one second series observation record of said one specific tested person with comparable observation data or derived data from at least one first series observation record of said one specific known person, and provides at least one conclusion from said comparing, (f) a determining step, wherein said identity authentication process utilizes at least one member selected from the group consisting of
  (i) at least one part of said at least one conclusion from said at least one comparing step,
  (ii) at least one part of said observation data,
  (iii) at least one part of said derived data, and
  (iv) selected useful information, for making said at least one identity authentication test determination, and (g) a reporting step, wherein said identity authentication process provides at least one selected report regarding at least one part of at least one cycle of utilization of said identity authentication process.

* * * * *